April 21, 1970  H. LINDE  3,507,576
SYSTEM FOR PROVIDING DIFFERENT MAGNIFICATION RATIOS IN
PHOTOGRAPHIC COMPOSING APPARATUS
Filed July 12, 1967  3 Sheets-Sheet 3

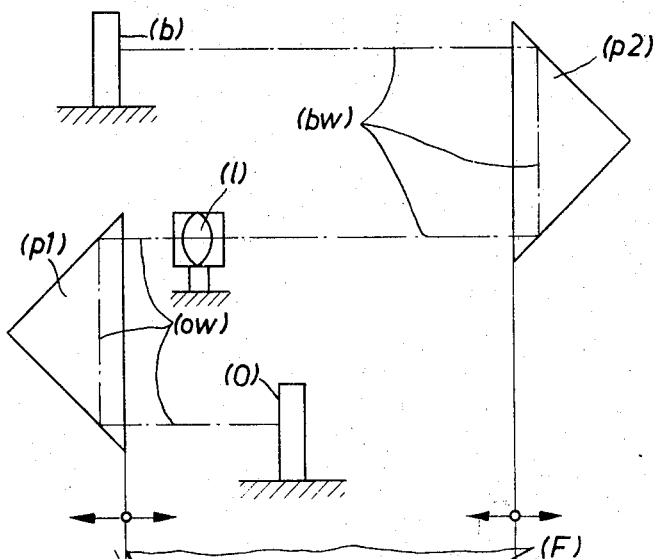
Fig. 2
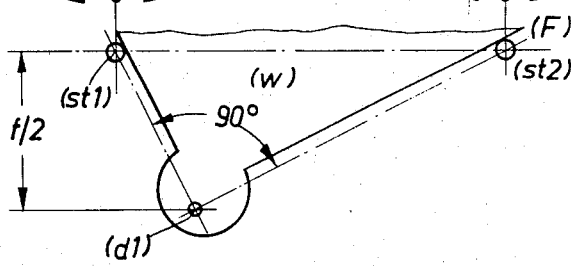
Fig. 3
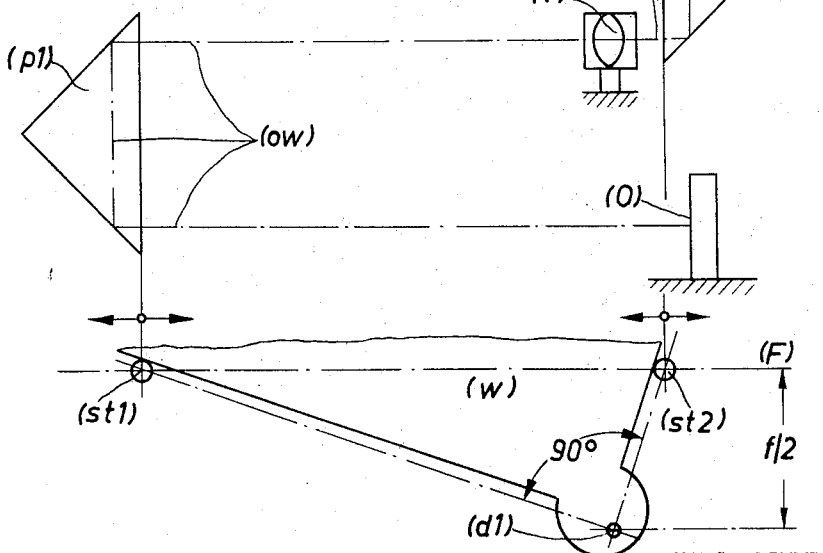
HANS LINDE
Inventor:

HANS LINDE
*Inventor:*

Karl F. Ross

United States Patent Office 3,507,576
Patented Apr. 21, 1970

3,507,576
SYSTEM FOR PROVIDING DIFFERENT MAGNIFICATION RATIOS IN PHOTOGRAPHIC COMPOSING APPARATUS
Hans Linde, Berlin, Germany, assignor to H. Berthold Messinglinienfabrik und Schriftgiesserei A.G., Berlin, Germany, a company of Germany
Filed July 12, 1967, Ser. No. 652,806
Int. Cl. G03b 27/36
U.S. Cl. 355—57    4 Claims

ABSTRACT OF THE DISCLOSURE

Two dual reflectors, movable parallel to each other in opposite directions under the control of an inversor, are positioned on opposite sides of a fixed objective to direct light rays along parallel paths from an object plane through the objective onto an image plane. The inversor is a generally triangular structure in the form of a block or a linkage which pivots about a fixed fulcrum and operatively engages respective extensions of the mountings of the two reflectors to displace them along a common line parallel to the ray paths.

---

The present invention has as its object a device for variable optical reduction and/or enlargement of the image in photographic composing equipment, particularly apparatus.

In conventional optical devices enabling variation of image size, at least two elements must be displaced in order to vary the enlargement. In optical systems having a single objective only, either the object and image planes are displaced, or the object plane and the objective, or else the image plane and the objective. The object and image planes may remain stationary in optical systems comprising two or more objectives, but the position of both or all said objectives must be varied in the ray path.

These known systems have the disadvantage that entire component units must be displaced relative to the optical ray path a substantial extent, in conformity with the operations of a photographic composing apparatus wherein the object plane bears characters and is limited by adjustable, the image plane bearing a photographic layer and being displaceable generally in a single co-ordinate system. Although systems comprising two or more objectives may well have the advantage of fixed object and image planes, the displacements of the said objectives, which must comply with optical laws, require complex lever and cam arrangements or the like.

According to the present invention, the required lengthening and shortening of the ray paths at the image object sides is obtained, with the objective fixed as well as the image and object planes, by displacing two or more reflectors, preferably reversing reflectors, placed in the ray path. The displacement of the reflectors occurs according to an optical law in which the sum $ow$ of the ray paths at the object side and the sum $bw$ of the ray path at the image side have the following relationship for the magnification $n$, $$ow/bw = n$$

According to the invention, the objective as well as the image and object planes remain fixed during enlargement and/or reduction of images, and the apparatus is of simple construction owing to the elimination of the displacement means heretofore required.

The invention will now be described in greater detail with reference to the accompanying drawing in which;

FIG. 2 shows the setting of the elements of FIG. 1, for an optical enlargement of 2:1;

FIG. 3 shows the position of the elements of FIGS. 1 and 2 for an optical reduction of 1:3;

Figure 1:
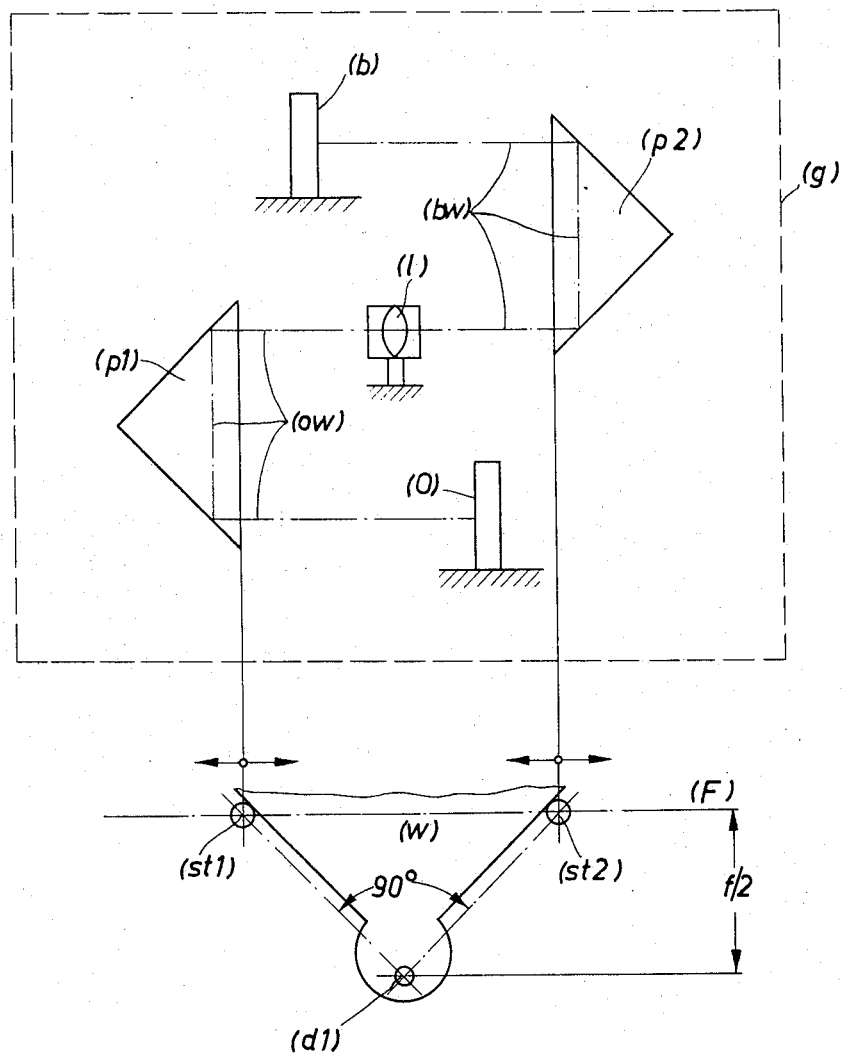
FIG. 1 is a diagrammatical illustration of an optical system according to the invention, in which a so-called "angle inversor" causes an optical enlargement of 1:1 in the position illustrated.

According to FIG. 1, the shortening and lengthening of the image and object distances, respectively for varying character size is accomplished with the aid of two displaceable dual reflectors which are controlled by means of a so-called inversor $w$, have the form of 45° prisms $p1$ and $p2$ and are placed in the ray paths. The object plane $o$ may thus be fixed. The same applies to the image plane $b$ and the objective 1. Upon displacement of the reflectors $p1$ and $p2$ by rotation of the angle-lever inversor $w$, whose limbs extend at an angle of 90° to each other, about fulcrum $d1$ situated at a distance of $0.5f$ from a guiding device F, with pins $st1$ and $st2$ in the guiding plane always bearing against the limbs of the inversor $w$, the sum of the ray paths at the object side and the sum of the ray paths at the image side have the aforestated relationship, for the magnification $n$:

$$ow/bw = n$$

As will be apparent from FIGS. 2 and 3, displacement of the prisms by means of the inversor 2 produces an optical enlargement of 2:1 in the position of FIG. 2, and an optical reduction of 1:3 in the position of FIG. 3.

Figure 4:
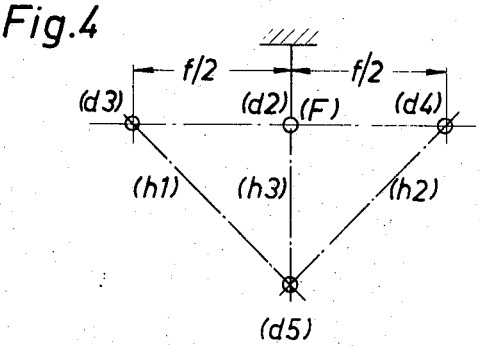
FIG. 4 shows a so-called hinged inversor for setting the displaceable elements in the ratio 1:1.

In the case of the so-called lever inversor illustrated in FIG. 4, the contact points $st1$ and $st2$ shown in FIGS. 1 to 3 are replaced by the pivot points $d3$ and $d4$ sliding in the guiding plane F and firmly connected to the reflectors $p1$ and $p2$. These the fulcra $d3$ and $d4$ are pivot points of two levers $h1$ and $h2$, of optional but identical length, intersecting of a common pivot $d5$ which constitutes the fulcrum point of a third lever $h3$. The pivot point $d5$ is swingable about the stationary pivot point $d2$ of the lever $h3$. The length of the lever $h3$ is so determined that, for an enlargement ratio of 1:1, the pivot points $d3$ and $d4$ are each positioned at a distance of half the focal length from the stationary pivot point $d2$ in the guiding plane F. When the lever $h3$ is swung about the pivot point $d2$, the refflectors $p1$ and $p2$ are operated again through the points $d3$ and $d4$ according to the optical law specified.

A device according to the invention may also be operated by means of other inversors or cam systems or the like, for displacing the reflectors, or the displacement of the reflectors may be brought about in steps, by detents or their equivalents.

As is apparent from FIG. 1, the parts of the device shown are arranged on a baseplate $g$. The external boundaries of the device are optional and may be chosen in conformity with the pervailing conditions. It is essential for the invention that the bearer of image plane $b$, the objective 1 and the object plane $o$ be fixedly mounted on the baseplate $g$. The displacement of the prisms $p1$ and $p2$ by means of the so-called angle inversor $w$ occurs in suitable guides on the base plate.

Figure 5:
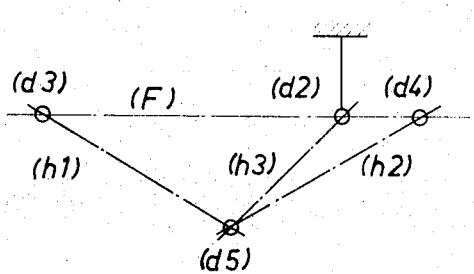
FIG. 5 shows the position of the hinged inversor according to FIG. 4 for the enlargement 2:1.
Figure 6:
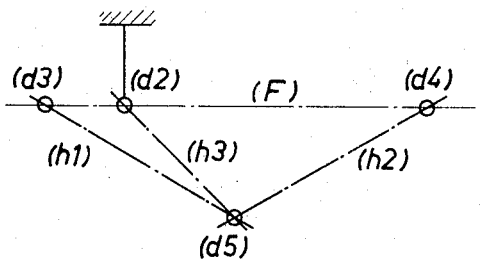
FIG. 6 shows the position of the so-called hinged inversor for the reduction 1:2.

It will thus be seen that I have provided a system in which the dual reflectors $p1$ and $p2$ are movable in mutually opposite directions by means of extensions of their respective mountings, diagrammatically illustrated at $st1$, $st2$ in FIGS. 1-3 and at $d3$, $d4$ in FIGS. 4-6, which are in operative engagement with the inversor on opposite sides of the latter's fulcrum $d1$ or $d2$. (In the positions of FIGS. 1 and 4, representing a magnification ratio of unity, the locations of these points of engagement are symmetrical with reference to the fixed fulcrum.) In the first embodiment, in which the generally triangular inversor structure is a rigid member with mutually perpendicular sides, the extensions $st1$, $st2$ are in camming engagement with these sides and lie on a common line F offset from the fixed fulcrum at the vertex $d1$ of the triangle. In the second embodiment, in which the triangular structure of the inversor consists of three levers $h1$, $h2$ and $h3$ having their first ends articulated to one another at the vertex $d5$, the fixed fulcrum $d2$ is located at the second end of lever $h3$ and lies on the line F of displacement of the corresponding ends of levers $h1$ and $h2$ constituting their points of articulation to the extensions of the reflector mountings.

I claim:
1. A system for providing different magnification ratios between an object and a photographic image thereof, comprising object-bearing means defining a fixed first plane, image-receiving means defining a fixed second plane parallel to but offset from said first plane, movable first reflector means confronting said first plane for receiving light rays therefrom along a first path normal to said planes and for directing said light rays along a second path parallel to said first path, movable second reflector means confronting said first reflector means and said second plane for redirecting said light rays toward said second plane along a third path normal thereto, first and second mounting means respectively supporting said first and second reflector means for linear displacement thereof in a direction parallel to said paths, a fixed optical objective in said second path, and inversor means pivotable about a fixed fulcrum for imparting correlated but mutually opposite motion to said first and second reflector means, said first and second mounting means having extensions operatively engaging said inversor means for displacement thereby along a common line parallel to said paths.

2. A system as defined in claim 1 wherein said inversor means comprises a generally triangular structure with a vertex offset from said common line.

3. A system as defined in claim 2 wherein said fulcrum coincides with said vertex, said structure being a rigid member with mutually perpendicular sides in camming engagement with said extensions.

4. A system as defined in claim 2 wherein said structure is a linkage consisting of three levers having first ends articulated together at said vertex and second ends lying on said common line, said fulcrum being located at the second end of one of said levers, the second ends of the other two levers being articulated to said extensions.

References Cited

UNITED STATES PATENTS

| | | | |
|---|---|---|---|
| 2,823,580 | 2/1958 | Gannett | 355—57 |
| 3,215,034 | 11/1965 | Woodcock | 355—57 |
| 3,290,989 | 12/1966 | Beattie et al. | 355—57 |

FOREIGN PATENTS 907,375   3/1954   Germany.

JOHN M. HORAN, Primary Examiner

R. A. WINTERCORN, Assistant Examiner

U.S. Cl. X.R.

355—60, 65, 66